Oct. 31, 1939.   H. T. FISHER   2,177,699
BUILDING SYSTEM
Filed April 1, 1936   7 Sheets-Sheet 1

Inventor,
Howard T. Fisher
Offield, Towle,
Scott & Poole Attys.

Oct. 31, 1939.  H. T. FISHER  2,177,699
BUILDING SYSTEM
Filed April 1, 1936   7 Sheets-Sheet 2

Oct. 31, 1939.                H. T. FISHER                2,177,699
                              BUILDING SYSTEM
            Filed April 1, 1936              7 Sheets-Sheet 7

Witness:
Chas. R. Koursh.

Inventor,
Howard T. Fisher
Offield Mahlepe Peart + Poole  Attys

Patented Oct. 31, 1939

2,177,699

UNITED STATES PATENT OFFICE 2,177,699

BUILDING SYSTEM

Howard T. Fisher, Winnetka, Ill., assignor to General Houses, Inc., Chicago, Ill., a corporation of Delaware Application April 1, 1936, Serial No. 72,001

4 Claims. (Cl. 189—1)

This invention relates to improvements in building structures and methods of building construction, and more particularly to buildings in which the principal structural elements are factory made or prefabricated in standardized shapes and sizes, and then assembled on the building site.

It has long been realized that present methods of building construction, especially with regard to dwellings, are extremely wasteful and inefficient in their use of materials and methods of assembly.

Among the principal objects of the present invention is to provide an improved design and arrangement of prefabricated structural elements, such as skeleton frame parts, into which the wall, roof and partition panels can be applied to make a quick, neat and simple assembly, and providing a structure conforming to present day standards of structural soundness and durability.

A further object of invention is to afford great flexibility and variety in floor plan arrangements, using the same or readily modified standard structural elements, but in different relative positions to each other.

This problem of overcoming the limitations to substantial variations in building design prescribed by the use of standardized prefabricated building elements has long been recognized, and many efforts have been made to increase the possibilities of such variations by the employment of certain types of interchangeable building elements and methods of assembly. Such building constructions and systems, however, have usually failed of commercial practicability, largely because the introduction of any substantial variations in building design usually requires a large number of additional parts, or the cutting and fitting of standard parts on the building site, or both.

In carrying out my invention, I have devised a novel system in which all of the standard building elements are made to conform to a predetermined module system, to be hereinafter described in detail, whereby an infinite variation in floor plans and architectural designs may be assured with a minimum selection of standardized building elements, such as studs, beams and panels.

Other features and objects of my invention will appear from time to time as the following specification proceeds.

The invention may best be understood by reference to the accompanying drawings, in which.

Referring now to the details of the structural features illustrated in the drawings, which constitute one embodiment of my invention, it will be understood that all of the principal structural elements, including upright studs, horizontal cross beams, upright panels for walls, windows and doors, and floor and roof panels, are of the type that may be prefabricated at the factory of predetermined sizes and shapes to be capable of interchangeable use in a wide variety of building plans conforming to my improved "module line system."

Figure 1:
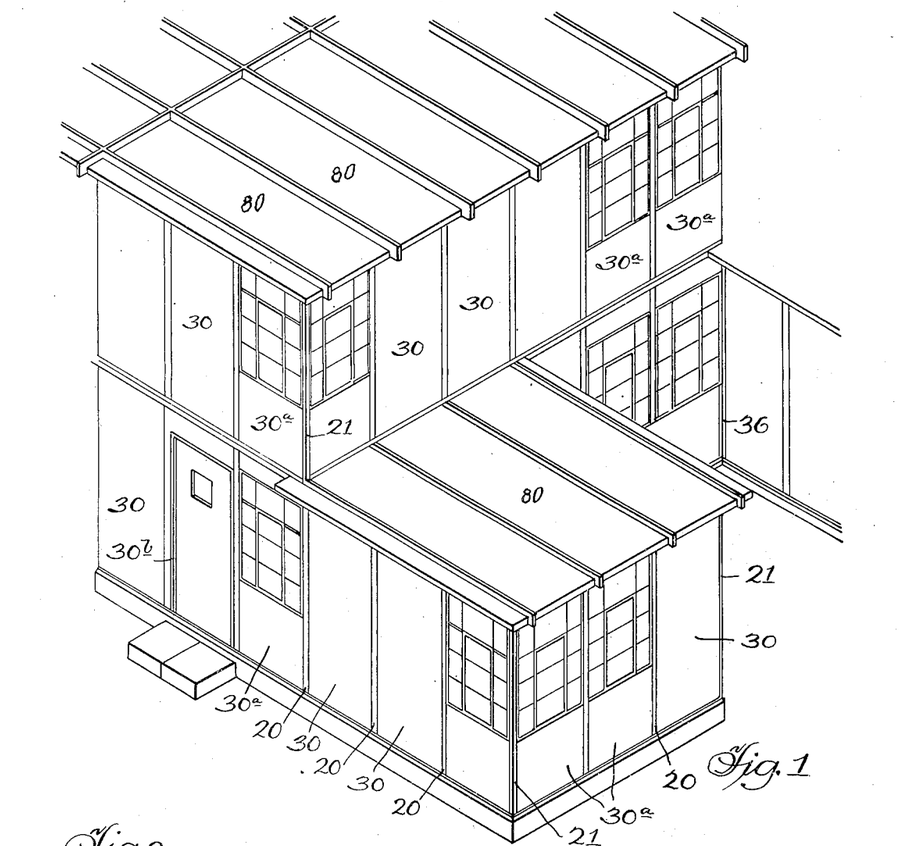
Fig. 1 is a fragmentary view in perspective of a two-story dwelling constructed in accordance with my invention.

The principle of my "module line system" is illustrated in the diagram (Fig. 2) which shows a typical floor plan of a building such as that illustrated in Fig. 1. It will be observed that in designing the building a plurality of parallel, equi-spaced module lines B—B and other similar lines C—C intersecting lines B—B at right angles are laid out on the floor plan to form squares of equal size. The distance between adjacent module lines will be constant for each plan, and is preferably based on the width of an upright building panel that can be conveniently handled in a building system of this character. The upright elements of the framework consist of a plurality of studs which are placed at certain points of intersection A of the module lines, while the upright building panels are mounted between adjacent studs along certain module lines.

The studs are provided with two or more grooves for receiving the adjacent edges of the upright building panels, each of which grooves is disposed with its median plane intersecting the longitudinal axis of the stud. Where said grooves are at an angle to each other, their median planes are at a right angle to the other groove or grooves carried by said stud. The arrangement is such that the building panels of the same or different types may be interchangeably mounted in any of the grooves in said studs, as will hereinafter more fully appear.

Figures 3, 4, 5, 6:
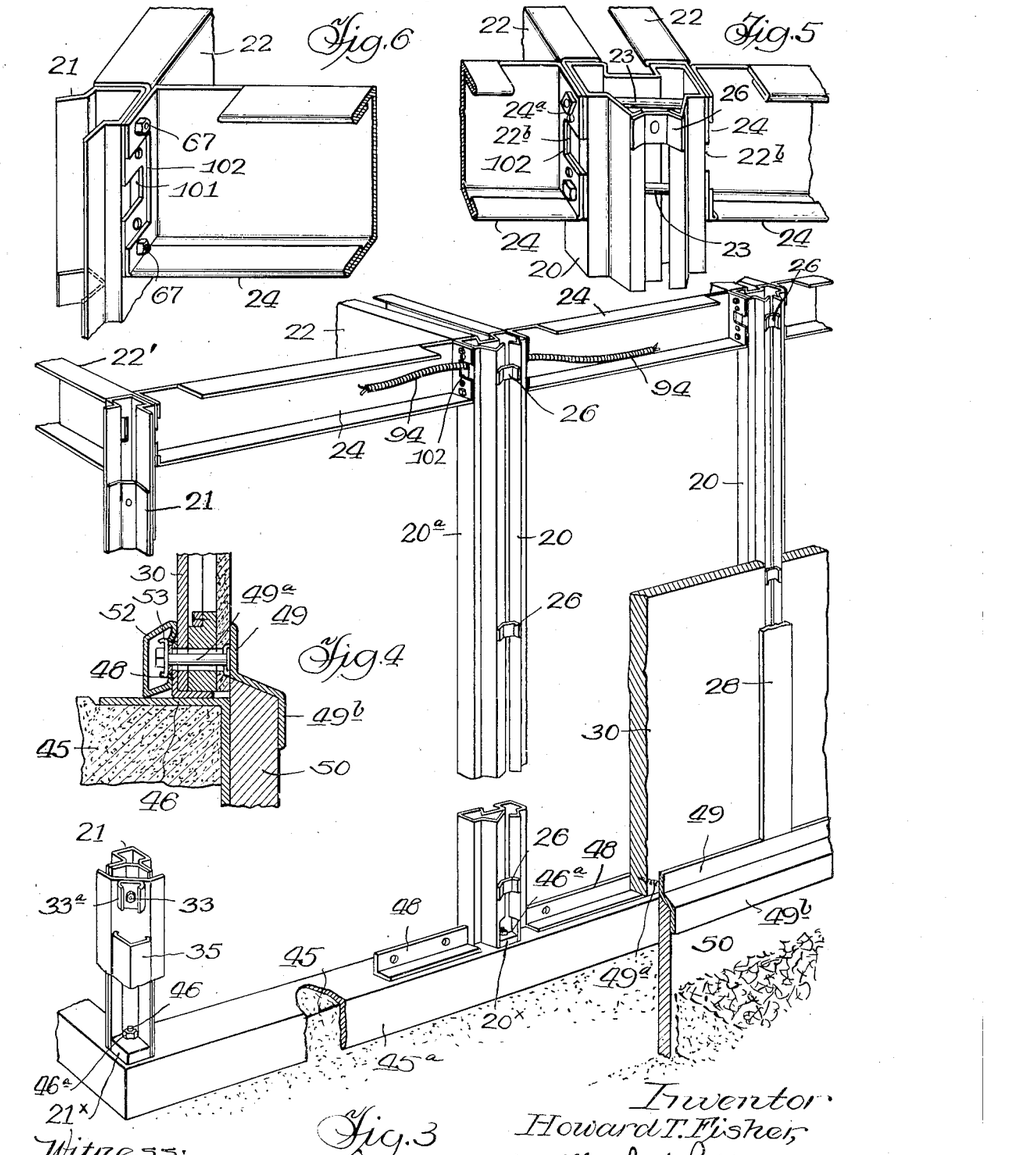
Fig. 3 is a fragmentary perspective view showing a part of the framework of a building extending to one-story height with portions of certain building panels and other structural features applied to said framework.
Fig. 4 is an enlarged detail section through the foundation sill showing one method of mounting and securing the lower edge of a wall panel thereon.
Fig. 5 is an enlarged fragmentary detail view showing an arrangement for joining an upright column, cross beams and spandrels.
Fig. 6 is an enlarged fragmentary view showing an arrangement for joining a corner stud, cross beam and spandrel.

Referring now to details of construction and arrangement of the principal building elements employed to carry out the module system forming a part of my invention, Fig. 1 shows a portion of a two-story dwelling made in accordance therewith. A portion of the framework is illustrated in Fig. 3, which includes a plurality of upright side studs $20$, a corner stud $21$, intermediate cross beams $22$, end beams $23$, and spandrels $24$.

The side studs $20$ are each preferably formed of sheet metal bent upon itself to form a substantially hollow load-supporting member. This basic type of stud is adapted for use in almost all exterior and interior upright frame members, and with certain modifications, to be presently described, may also be used at exterior and interior corners of the structure. Said studs may be made in standard lengths to extend for one or two story heights, as required.

Figures 7, 8, 9, 10, 11, 12:
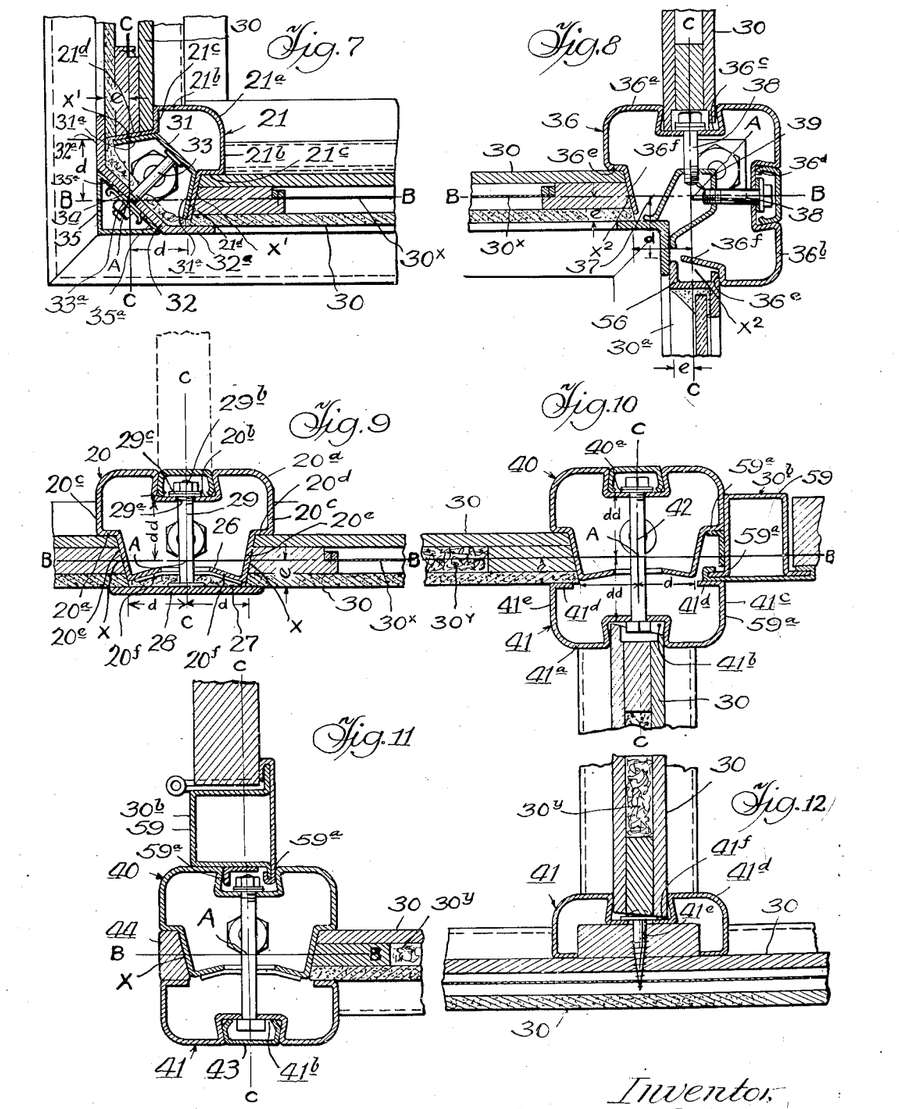
Fig. 7 is an enlarged horizontal detail section taken through a corner stud and two exterior wall panels connected thereto.
Fig. 8 is a horizontal section taken through another form of corner stud and showing three upright panels connected thereto, including an exterior wall panel, an interior wall panel and a window panel.
Fig. 9 is a horizontal section taken through an upright wall stud of the type preferably used on the exterior of the building and showing two exterior wall panels connected thereto.
Fig. 10 is a horizontal section taken through an upright wall stud of the type preferably employed in interior construction and showing three upright building panels connected thereto, including two interior wall panels and a door panel.
Fig. 11 is a view of a modified form of wall stud of the general type shown in Fig. 10, and showing an interior wall panel and a door panel connected thereto.
Fig. 12 is an enlarged horizontal section taken through a modified form of upright wall stud especially designed to permit connection of an interior wall panel with an exterior wall panel at points intermediate the standard upright studs.

The form of stud shown in detail in Fig. 9 illustrates one of the simplest adaptations of such studs where it is used as an exterior load-supporting member, with the abutting edges of two building panels $30$, $30$ secured in alignment with each other at opposite sides of said stud to form the exterior wall of the building. (See also the studs $20$, $20$ in Fig. 3.)

The main body of each stud $20$ is formed of sheet metal shaped with an inner wall $20^a$ provided with a centrally disposed groove $20^b$, two side walls $20^c$ each having an outwardly facing shoulder $20^d$, and an outwardly converging portion $20^e$ forming in effect a recess $X$ at each outer corner of said stud, and a pair of inwardly extending flanges 20ᶠ with their edges spaced apart. Said flanges may be reinforced at suitable intervals by one or more tie strips 26 welded across the outer faces of said flanges.

The recesses X are designed to receive the edges of upright building panels 30 (to be presently described in detail) in closely fitting engagement by means of a retaining strip 28 detachably secured to the stud. In the form shown in Fig. 9, said retaining strip consists of a flat metal piece, commonly referred to as a "batten", which extends along the open side of the stud, but preferably spaced therefrom, with its lateral margins engaging the outer surface of the adjacent panels 30 at their extreme edges. A plurality of bolts 29 are suitably attached to the batten along its center, as by welding the heads of said bolts to the inner face thereof. Said bolts are so spaced at predetermined intervals as to extend through registering apertures 29ᵃ formed in the opposite or inner wall of the stud 20. In the form shown, said apertures are formed in the bottom wall of the groove 20ᵇ. The batten is finally secured by nuts 29ᵇ disposed in said groove, and threaded on the end of the bolts 29.

The bolt apertures 29ᵃ preferably afford substantial clearance around the bolts, and a heat-insulating washer 29ᶜ of suitable material such as fibre is interposed between each nut and the adjacent bottom of the groove 20ᵇ, so as to break the metal-to-metal contact between the batten and the main body of the stud, thereby minimizing the communication of heat (or cold) from one side of the wall to the other, and eliminating condensation of moisture along these joints. Other insulating material such as strips of felt or the like, may also be interposed between the batten and the outer face of the stud body 20 to insure non-metallic contact at this point, as indicated at 27 in Fig. 9. The interior of the studs may also be filled with insulating material such as rock wool (not shown), if desired.

It will now be observed that the exact relationship between the inner wall of the centrally disposed groove 20ᵇ, the recesses X and the module lines B—B and C—C in the stud 20 of Fig. 9 is of vital importance in maintaining the fixed modular system and standardized panels I have developed. Many systems of prefabrication developed in the past have proven impractical because of the failure of the designer to appreciate the importance of this relationship. Referring to Fig. 9, it will be seen that dimension $d$, which represents the distance between each terminal edge of panels 30 and the module line C—C at right angles thereto, substantially equals dimension $dd$, which represents the corresponding distance between the module line B—B and the terminal edge of a panel if placed in groove 20ᵇ on the module line C—C, and that the exact modular relationship is obtainable when and only when both $d$ and $dd$ are greater than dimension $e$, which represents the distance between the edge of panel 30 at its widest point and the module line B—B on which said panel is disposed. In other words, it will be noted that the terminal edge of each panel 30 is disposed when assembled so that the distance measured perpendicularly from its own module line to any point along its own terminal edge is always less than the distance measured perpendicularly from the same point on its terminal edge to the adjacent intersecting module line. In the form shown, the dimension $e$ equals half the thickness of the wall panel. Whatever the exact form of column, panel, etc., a modular system can be developed, using panels of standard width for walls and partitions in floor plans of infinite variety of form and arrangement, provided the relationship above described is maintained, where dimension $d$ substantially equals $dd$, and $d$ and $dd$ are greater than dimension $e$.

The corner stud 21 is shown in enlarged detail in Fig. 7. It consists of an inner member 21ᵃ formed of sheet metal with two side walls 21ᵇ, 21ᵇ disposed at right angles to each other, two shoulders 21ᶜ, 21ᶜ converging toward each other at right angles, and outwardly flared terminal flanges 21ᵈ, 21ᵈ so as to produce two recesses X¹, X¹ for receiving the edges of building panels 30, 30. A reinforcing member 31 of sheet metal extends diagonally across the inner corners of the recesses X¹, X¹, having flanges 31ᵃ, 31ᵃ welded to the flanges 21ᵈ, 21ᵈ, as shown. The building panels are secured in the recesses X¹, X¹ by means of a metal retaining strip 32 having two marginal flanges 32ᵃ, 32ᵃ bent at 45° thereto and engaging the extreme outer edges of said panels. The retaining strip is secured to the corner stud by a plurality of bolts 33 having their heads welded to the diagonal reinforcing member 31. Insulating fibre washers 34 are interposed between the nuts on said bolts and said retaining strip, to break the metal-to-metal thermal communication between the inner and outer metallic members.

The corner stud may be completed by a metal angle strip 35 having its side faces flush with the flanges of the retaining strip 32 as shown, and with inwardly turned terminal flanges 35ᵃ arranged to be pressed into retaining position over the ends of spring clips 33ᵃ mounted on the outer ends of the bolts 33.

It will be observed that the corner stud 21 embodies many of the same structural features as the side stud 20 illustrated in Fig. 9, excepting that the panel-retaining recesses or grooves X¹, X¹ are disposed at right angles to each other, instead of in alignment with each other. It will be noted that the relationship between dimensions $d$ and $e$, indicated in Fig. 7, is identical to that in the side stud 20, and that it is this feature which makes it possible to provide a large variety of irregularly shaped plans, still adhering to a fixed modular system and still using the same sized prefabricated panels and other members.

Another form of corner stud illustrated in Fig. 8 is provided for use at a corner of the building in which the exterior walls meet each other at an acute right angle to each other, rather than at an obtuse right angle to each other as with the form of corner stud shown in Fig. 7. In this modified form of corner stud, the main body 36 consists as before of sheet metal with two inner walls 36ᵃ and 36ᵇ at right angles to each other, and each provided with grooves 36ᶜ and 36ᵈ, respectively. The two opposite walls extending toward the exterior of the building are provided with shoulders 36ᵉ, 36ᵉ, and inwardly flaring terminal flanges 36ᶠ, 36ᶠ, respectively, each forming recesses X², X² adapted to receive the adjacent margins of connected building panels in substantially the same manner as the recesses X, X of the form of stud shown in Fig. 9 and X¹, X¹ of the form of stud shown in Fig. 7. The exterior retaining strip 37, which corresponds in function to the retaining strip or batten 28 shown in Fig. 9, and the retaining strip 32 in Fig. 7, here consists of an angle iron having its lateral edges engaging the outer surfaces of the building panels 30 and 30ᵃ. The retaining strip 37 is secured by means of bolts 38 inserted through the bottom of the grooves 36ᶜ and 36ᵈ and having their inner ends threaded in a metal retaining bracket 39 suitably connected, as by welding, to the inner face of the retaining strip 37 and extending inwardly therefrom as shown. In the case of this stud it will be noted that the same relationship between dimensions d and e as exists in the previously discussed stud assemblies has been maintained.

The stud construction illustrated in Fig. 10 is particularly adapted for use in connection with interior partitions, or where a substantially flat exterior joint is not required. It will be observed that the main body of this stud indicated at 40 is identical with the body portion of studs 20, but instead of utilizing a relatively flat retaining strip or batten 28, a complementary metallic member 41 is substituted therefor consisting of a sheet metal piece having an outer wall 41ᵃ formed with a panel-receiving groove 41ᵇ therein and side walls 41ᶜ having inwardly extending terminal flanges 41ᵈ which engage the outer surfaces of the adjacent building panels 30 and 30ᵇ. The complementary member 41 is secured to the body portion of the stud by a plurality of bolts 42 extending through the bottom of the groove 41ᵇ and the opposite groove 40ᵃ of the main stud portion 40. In the arrangement illustrated in Fig. 10, the stud is arranged to receive two building panels 30, 30 forming an upright plain wall of the structure, and a third building panel 30ᵇ including a door frame 59. It will be understood, however, that the several types of building panels shown in connection with the different types of studs are interchangeable with each other. Certain variations in form of such building panels, including those used for upright walls, windows and doors, will be hereinafter more fully described. It will be further observed in connection with the exact relationship between dimensions d, dd and e that these have been maintained as in the stud assemblies previously discussed.

Fig. 11 shows a stud construction and arrangement also adapted for interior partitions, in which the main body portion 40 of the stud, and the complementary portion 41 are substantially the same as shown in Fig. 10, but having only two building panels 30 and 30ᵇ connected therewith. In this instance the unused groove 41ᵇ is filled by a metallic strip 43 substantially U-shaped in cross-section and adapted to be sprung into said groove to form a substantially flat exterior surface as shown. The unused recess or groove X at the right side of this figure is filled by another form of filler piece 44 which may consist of wood or other similar material retained in said groove, as for instance by the pressure imposed thereon by connecting the parts 40 and 41 of the stud.

Figures 13, 14, 15, 16, 17, 18:
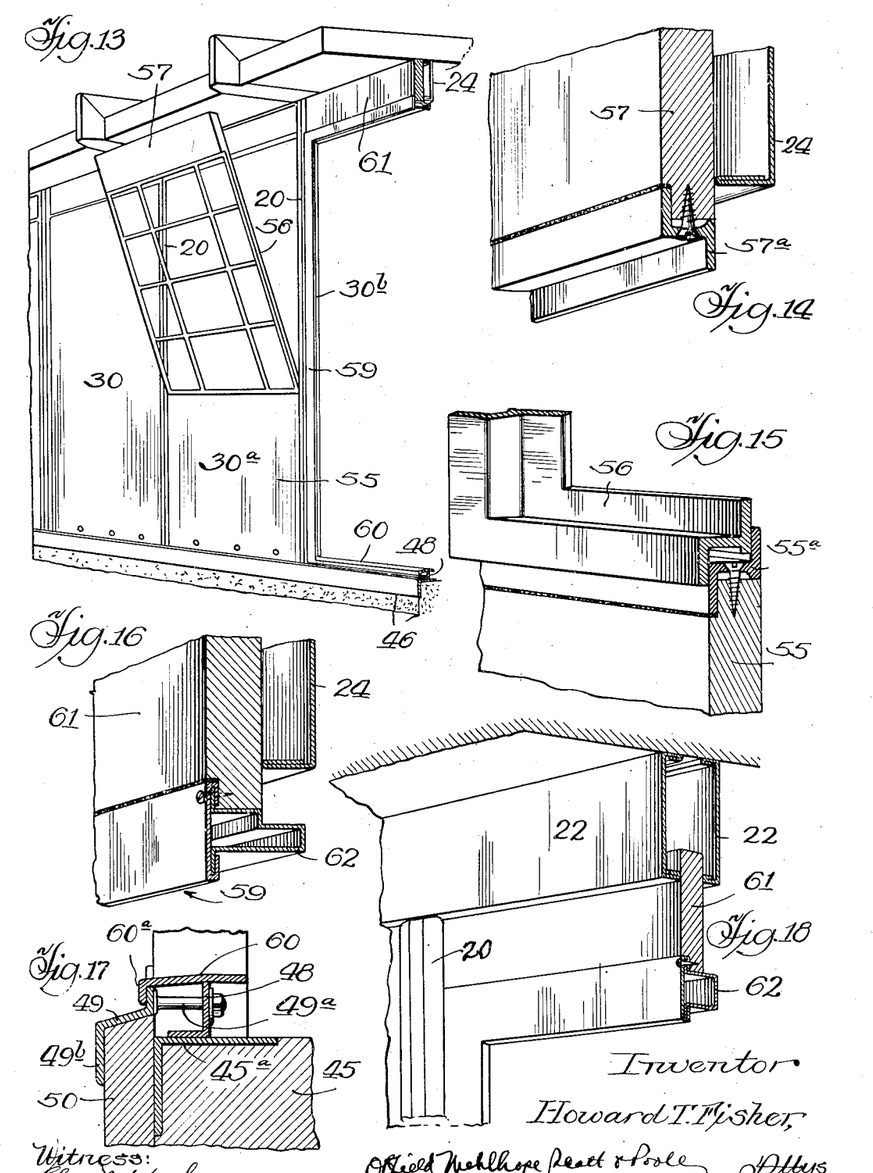
Fig. 13 is a perspective fragmentary view of an exterior wall of a building and showing three standard types of upright building panels, namely, plain wall, window and door panels, and illustrating the method of application of said panels to the building framework.
Fig. 14 is an enlarged detail view showing the upper portion of the window panel shown in Fig. 13 including the metal frame for the window.
Fig. 15 is a detail view of the window panel, showing the window sill and the metal window frame seated on the latter.
Fig. 16 is an enlarged detail view showing the upper portion of the door panel and metal door frame thereof.
Fig. 17 is an enlarged detail section of the sill of a door panel and showing one method of mounting said door sill on the building foundation.
Fig. 18 is an enlarged detail section showing a modified form of door panel and metallic frame especially designed for use in the interior of the building, and showing the method of mounting the upper edge of said door panel and similar building panels between the opposed flanges of cross beams forming a part of the building framework.

Referring now to the upright building panels herein previously referred to as having their lateral edges fitting in the grooves or recesses in the upright studs, said panels may consist of a plain wall panel 30, a window panel 30ᵃ or a door panel 30ᵇ, the general forms of which are illustrated in Fig. 13. Such panels are preferably prefabricated in finished form, so that when they are delivered to the building site they may be assembled in the building without further cutting or fitting.

The plain wall panels 30 may be made of any suitable material, such as a frame of wood, overlaid with opposite outer walls finished with various suitable materials, such as laminated wood, plaster board, asbestos cement board or the like, depending on whether the panel is to be used on the exterior or interior of the building. So far as practicable, the outer wall surfaces are delivered to the building site with their final or nearly final finish, so as to require a minimum amount of finish and decoration after assembly. Any suitable insulating material may be used between the two opposite walls of the panels. In the forms shown in part section in Figs. 7 to 9, the exterior wall panels are provided with a sheet 30ˣ of insulating material, while other wall panels, used for interior partitions, may be filled with a suitable sound-deadening material such as fibre wool, sound-deadening felt, or mastic, as indicated at 30ʸ in Figs. 10, 11 and 12.

The window panel 30ᵃ includes as a part of its area a window frame of any suitable design. In the form shown in Figs. 13, 14 and 15, the lower part of the window panel 30ᵃ consists of a plain or blank lower panel section 55, a metal window sill 55ᵃ, a removable metal window frame section 56, a fixed upper metal window strip 57ᵃ, and a top board 57, all fitted together between the adjacent upright studs 20, 20 to close the space therebetween. The lower sill 55ᵃ consists of a Z-shaped metal strip mounted on the upper edge of the lower panel section 55, and similarly the upper window strip 57ᵃ is mounted on the lower edge of the top board 57. The sides of the metal window frame 56 are preferably of a width to fit directly into the grooves of the upright studs, as clearly shown in Fig. 8.

The door panel 30ᵇ consists of a metal frame 59 having two marginal projections 59ᵃ (see Figs. 10 and 11) spaced apart so as to form lateral edges of the same width as the corresponding edges of the plain panel 30 and the window panel 30ᵃ.

In the form of door frame shown in Fig. 16, the frame has a hollow inward extension 62 connected to a top board 61. This form of door frame is particularly adapted for use on the exterior of the building as indicated in Fig. 13.

Fig. 18 indicates a modified form of door frame which may be used in an interior portion of the building. Its upper board 61 may be inserted between a pair of cross beams 22, 22 in the same manner that the upper edges of the other forms of panels may be assembled in said beams.

From the above description, it will be observed that the different types of upright panels, including those used for plain walls, windows or doors, and regardless of whether their edges are made of wood or metal, all have one feature in common, namely, the provision of lateral edges of equal width adapted to be interchangeably fitted in the grooves or recesses of the studs with which they are to be connected, and upper edges of equal width adapted to be fitted between oppositely mounted adjacent spandrels, or fitted into opposed beam flanges, as described.

It will be observed in this connection that the edges of certain of the upright panels, particularly those used on the exterior of the building, are cut at a slight angle so as to be wedged closely against the bottoms of the stud recesses, as for instance against outwardly converging wall portions 20ᵉ forming the inclined bottomed stud recesses X shown in Fig. 9. This construction insures a weatherproof joint, as is particularly desirable, of course, with exterior panels. In order to insure complete interchangeability of all types of panels in other panel-receiving grooves having a squared bottom, such as groove 36ᶜ formed in the interior face of the stud shown in Fig. 8 and groove 41ᵇ shown in Fig. 10, all of such square bottom grooves are of uniform depth corresponding with the maximum depth of the inclined bottomed recesses X, X of Fig. 9. Thus any panel which has its edge cut at an angle may also be fitted in the interior stud grooves with its outer walls facing in either direction.

In the case of metal panel edges such as provided by the side frame 56 of a window panel shown in Fig. 8, or the side frame members 59ᵃ of the metal door frame 59 shown in Figs. 10 and 11, said panel edges are arranged to extend into the stud grooves only to the minimum depth of the recesses X, X shown in Fig. 9. With this arrangement, the metal window and door frames may also be interchangeably mounted in both interior and exterior panel-receiving grooves to face in either direction, without disturbing the proper modular distance between the studs which support the opposite edges of said panels.

It will be understood further that the heads of connecting bolts or nuts which may be disposed in the panel-receiving grooves will not interfere with the insertion of the panel edges, since the latter are provided with suitable recesses to accommodate such bolt heads, or nuts, as the case may be. Thus in the form of wood frame 30 shown in Fig. 8, the edge of said frame is drilled out at suitable intervals as shown, to accommodate the heads of bolts 38. The metal window frame 56 and door frame 59ᵃ both have grooved outer edges, which accommodate the bolt heads or nuts, as clearly indicated in Figs. 8 and 11, respectively.

Referring now to the manner in which the several forms of load-supporting studs and upright panels above described are especially adapted to carry out the module system upon which my improved building system is based, it will be observed that in every instance a stud has an upright or longitudinal axis about which the panel-receiving grooves are disposed at right angles to each other, and symmetrically with respect to said longitudinal axis, that is to say, with the base of said grooves disposed at equal distances from said longitudinal axis, as at $d$ and $dd$.

Thus in the several forms of stud shown in Figs. 7 to 11, inclusive, the module lines of each stud are indicated by the lines B—B and C—C, having their point of intersection at the longitudinal axis A thereof.

Figure 2:
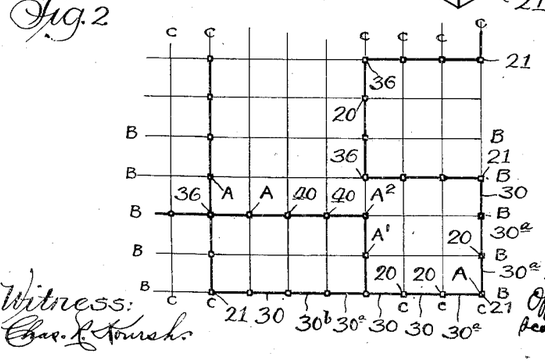
Fig. 2 is a diagrammatic floor plan illustrating the module line system employed in the design and assembly of the building, whereby the framework and partitions of said building are capable of being optionally disposed in varying relations with each other along predetermined module lines drawn in intersecting squares on the floor plan.

With this arrangement, any building plan contemplates the placing of a stud at a predetermined point of intersection A, A¹ or A², etc., of the module lines B—B and C—C which govern the particular plan, as indicated diagrammatically in Fig. 2, and with the median planes of the respective panel-receiving grooves of each stud coinciding with said module lines.

It will now be apparent that the building panels of several types may then be applied to the studs, with the median planes intersecting the edges of said panels which fit within the stud grooves also coinciding in each instance with a module line. Since all such panels are made prefabricated so as to fit between adjacent studs and fill the space therebetween, it will be readily understood that all of said panels may be interchangeable with each other, and certain panels may also be reversed so as to face in either direction between adjacent studs, thereby permitting unlimited variations of building design.

The possibilities of variation in floor plan design will now be more evident by reference to Fig. 2 which illustrates a floor plan laid out in accordance with the module line system. Corner studs 21 will be placed at all outer corners of the desired floor plan with the longitudinal axis of each of said studs coinciding with the point of intersection A of two module lines. Exterior intermediate studs 20, 20 will be disposed along the exterior wall at the intersections of the module lines, while exterior acute corner studs 36 will also be placed at the proper intersecting points as indicated. The walls forming the interior floor plan are defined by studs 40, and the spaces between each adjacent pair of studs are filled by upright panels, such as plain wall panels 30, window panels 30ᵃ or door panels 30ᵇ, as required. It will now be apparent that the upright panels are mutually interchangeable, and may be rearranged in any desired sequence or relation with the studs to provide an unlimited variation in building plans.

It will be manifest that more specialized forms of upright building panels, such as for stairways and fireplaces, can readily be provided to fit our modular system.

My module system as above described may, therefore, be stated as a simple formula:

$$T = NM = N(P+S)$$

in which T is the total length or width of the building, or of any offset portion or room thereof between opposite median lines. M is the module unit, N is the number of module units employed in the building or portion thereof, P is the effective width of the upright panels, and S is the effective width of a standard stud.

The slight difference in total width of a window and door panel on the one hand, as compared with the wall panels on the other, due to the tapered or inclined shape of the edges of the latter, will not affect the above formula, since as previously described the panel-receiving grooves are of sufficient depth to compensate for these slight differences in width of the panels.

Fig. 12 illustrates a modified form of stud which may be used in some instances where it is desired to use an upright panel at a point intermediate two module lines. In this instance a half stud 41 which herein consists of the same structural shape as the stud part 41 shown in Figs. 10 and 11, is secured to the face of an upright panel 30 as by means of screws 41ᵉ passed through the panel-receiving groove 41ᶠ of said stud member. The latter groove may then be used to receive a panel 30 of any suitable type. The use of the stud such as shown in Fig. 12 affords even greater flexibility in building design by permitting the use of partitions or panels at points intermediate the module lines established for a given floor plan.

Referring now more particularly to the means for anchoring the studs to the foundation or floor, a preferred construction is illustrated in Fig. 3 in which it will be observed that a foundation such as concrete indicated at 45, has an angle iron 45ᵃ fixed along the upper edge thereof to form a sill around the foundation. Said sill iron is preferably held in place by a plurality of bolts 46, 46 which have their lower ends embedded in the foundation and extend upwardly through the upper flange of the sill iron 45ᵃ at predetermined distances along the latter so as to register with the upright intermediate studs 20 or corner studs 21, as the case may be. Each of said studs has a horizontal plate 20ˣ or 21ˣ of substantial thickness welded within its hollow base. The bolts 46 pass through an aperture in said base plates and have a nut 46ᵃ threaded on their upper ends to hold said studs in their predetermined position with their longitudinal axes at the point of intersection of the intersecting module lines which control the particular design. For interior studs, the bases 20ˣ or 21ˣ may be secured to the floor or foundation by means of bolts or heavy screws passed downwardly through said base plates in any suitable manner as required for proper stability.

Referring now to details of construction and arrangement of the horizontal frame members forming a part of the framework, a typical arrangement is illustrated in Fig. 3 in which members 22, 22 form cross beams spanning a substantial portion of the building, and beams 24, commonly referred to as "spandrels", are used to connect adjacent studs.

The cross beams 22, 22 consist of two similar channel irons having their opposed flanges facing inwardly toward each other. Said flanges are preferably turned back on themselves, as shown, for added strength. The preferred method of connecting the ends of the beams 22 to the studs 20 is shown in detail in Fig. 5 wherein it will be noted that the upper and lower flanges of each channel iron are cut away so that the end portions 22ᵇ of the upright face of each channel iron is extended so as to overlap the adjacent side wall 20ᶜ of the stud 20.

The spandrels 24 usually consist of a single channel iron, also having its flanges turned back on themselves, as shown in Fig. 5. Where said spandrels are connected to a stud 20 and cross beam 22, it is provided with an end plate 24ᵃ bent inwardly to overlie the part to which said spandrel is connected, as for instance, the extended end portions 22ᵇ of the adjacent cross beam 22, as shown in Fig. 5. With this construction, each spandrel 24 and its adjacent cross beam 22 can be both secured to the side of the stud 20 by means of through bolts 23.

As will be seen from comparison of Figs. 5 and 6, the two flanged ends 24ᵃ of the spandrel are preferably cut somewhat differently, in the form shown in Fig. 6 the central portion of the flange being cut away so as to expose certain bolt holes provided for connecting the adjacent stud and cross beam 22 together. This arrangement permits partial assembly of parts of the framework before actual erection, thereby increasing the ease of final assembly of the framework.

Figure 19:
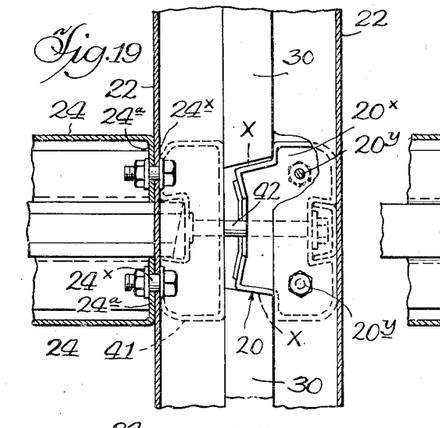
Figs. 19 to 21, both inclusive, are enlarged detail sections taken at various points of the framework of the building at beam height to show different permissible arrangements of, and connections between, the upright studs, cross beams and spandrels.
Figure 20:
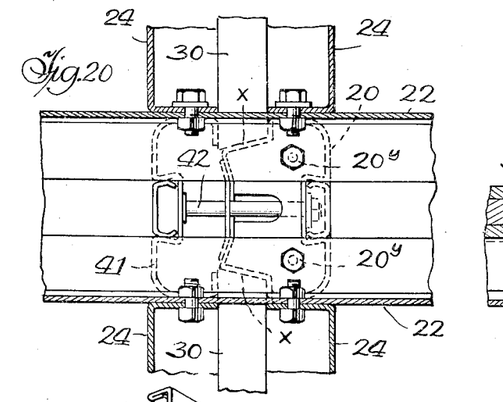

Certain modifications of cross beam and spandrel connections are shown in Figs. 19 and 20. In Fig. 19 the cross beams 22 are supported upon the upper end of a stud 20, which in the form shown also includes a complementary stud member 41 corresponding to the form of interior stud shown in Fig. 10. The stud member is provided with a top plate 20ˣ welded therein and secured in supporting engagement to the lower flange of one of the cross beams 22 by bolts 20ʸ. (See also Fig. 23.) The spandrels 24 are provided as before with inturned end plates 24ᵃ which overlie the upright face of the adjacent channel member 22, and is secured thereto by bolts 24ˣ.

Figure 23:
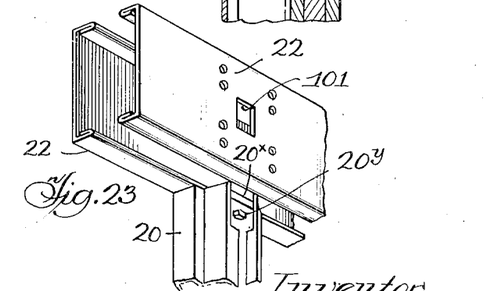
Fig. 23 is a detail perspective view illustrating the arrangement for connecting a main upright stud member to the bottom flange of one of the cross beams where the parts are disposed in the position shown in Fig. 19.
Figure 24:
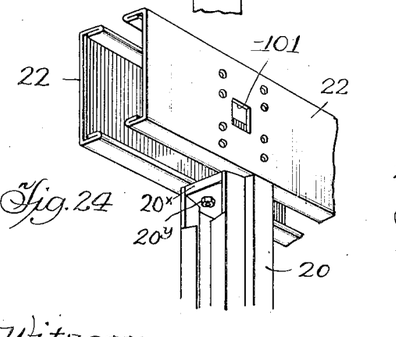
Fig. 24 is a perspective view similar to that shown in Fig. 23, but illustrating the arrangement for connecting the main upright stud member to the bottom flanges of the cross beams where the parts are in the position shown in detail in Fig. 20.

In the form of connection shown in Fig. 20, cross beams 22, 22 are shown as mounted on the upper end of the stud member 20 and supplementary stud member 41 at right angles to the position indicated in Figs. 19 and 23. In this instance it will be seen that the top plate 20ˣ is disposed crosswise of the two beams and is connected to both by bolts 20ʸ. (See Fig. 24.) In the form shown in Fig. 20, two pairs of spandrels 24, 24 are also shown as connected to both of the beams 22, 22. In every instance, however, it will be noted that the cross beams and spandrels are spaced apart with the edges of their opposed flanges in exact alignment with the panel-receiving grooves X, X formed on the sides of the studs 20. Consequently the upper edge of a building panel, either of the plain, window or door type, may be interchangeably fitted between the lower flanges of the cross beams or spandrels, and also with their side edges registering with the panel-receiving grooves in the studs, as clearly indicated in the figures just described.

Figure 21:
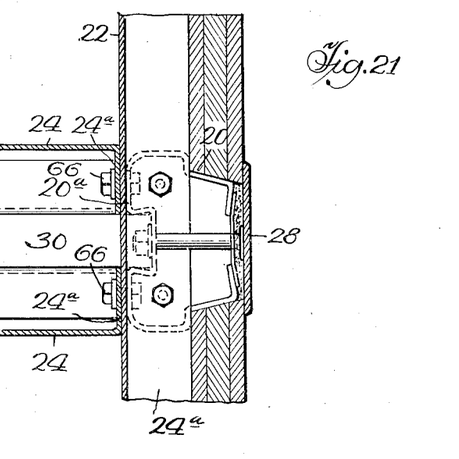

The form of connection shown in Fig. 21 shows the arrangement where a single cross beam 22 extends along an exterior wall of the building, resting upon a stud member 20, with two spandrels 24 connected to the sides of said cross beam at an intersection. It will be observed that this form of connection is somewhat similar to the construction shown in Fig. 19. In other words, the flanges of beam 22 rest upon the stud 20. The inturned end plates 24ᵃ of the spandrels are then engaged to the inner face of the cross beam, and the three elements are secured together by bolts 66, 66 as shown.

Figure 22:
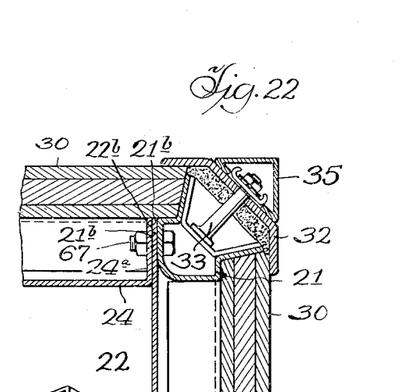
Fig. 22 is a view similar to Figs. 19 to 21, but showing the arrangement where a cross beam and a spandrel are connected to the corner stud.

Fig. 22 illustrates the same principle as applied to the connection between a corner stud 21, a beam 22, and a spandrel 24. In this instance the single cross beam 22 with an extended upright wall 22ᵇ overlies one side wall 21ᵇ of the corner stud 21, while the end plate 24ᵃ of the spandrel engages said extended wall 22ᵇ, and the three elements are secured together by bolts 67, 67. (See also Fig. 6.)

Figures 25, 26, 27, 28, 29:
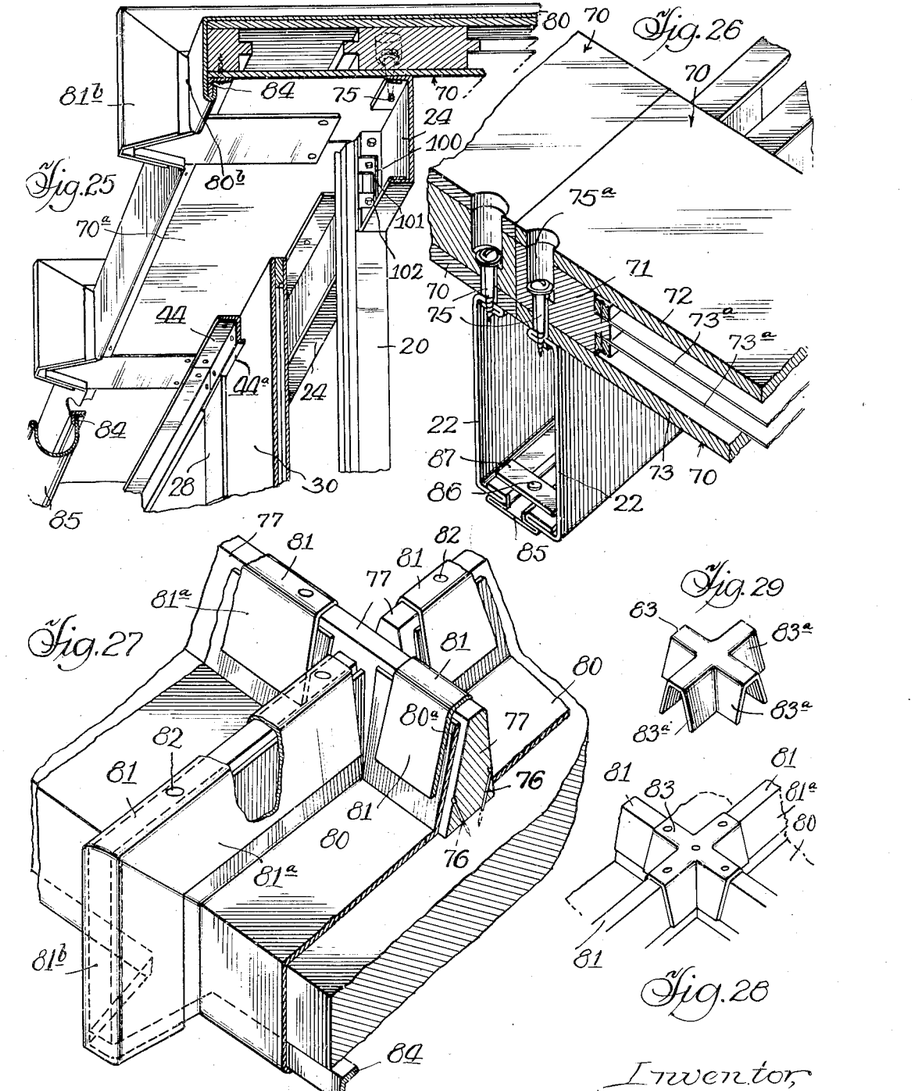
Fig. 25 is a fragmentary perspective view showing details of construction and assembly of parts of a building at the juncture of the roof and an exterior wall thereof.
Fig. 26 is an enlarged detail perspective view showing the method of securing the roof panels to the cross beams forming a part of the framework of the building.
Fig. 27 is an enlarged fragmentary view showing the details of construction of the roof panels and metal cover plates.
Fig. 28 is a view showing the construction and arrangement of the cover plate used at the junction point of the roof ridge members.
Fig. 29 is a detail of the metallic junction plate shown in Fig. 28 before it is applied to the roof.

Preferred methods of assembly of the exterior panels on the building framework are illustrated in Figs. 13, 14 and 16. Fig. 13 shows a standard or plain wall panel 30, a window panel 30ᵃ and a door panel 30ᵇ applied in the order named to the outer wall of a building. It will be observed that the upper edges of these panels engage the flanges of the spandrels 24, and are secured along their upper edges by suitable retaining strips such as angle irons 44 having inturned lower margins 44ᵃ, as shown in Fig. 25. Said inturned margins may be notched or cut away where the battens 28 pass thereunder, as is also shown in this figure.

When used on the exterior of the building, the sides of the panels are secured to the intervening studs 20 by the batten strips 28 and to the corner stud 21 by the strip 32, as previously described. The lower edges of said building panels are secured to the floor or foundation by means of upright angle irons 48, which herein are secured to the sill member 45ᵃ of the foundation, (see also Fig. 3). The angle iron 48 thus forms an upright shoulder to which the lower margins of the building panels may be secured, by means of a suitable retaining strip 49 having a plurality of bolts 49ᵃ passing through registering apertures in the angle iron 48.

Where the retaining strip 49 is used along the foundation of the building, as shown in Figs. 3 and 4, the lower part of said plate is preferably bent outwardly and thence downwardly to form an apron 49ᵇ which laps over the upper edge of the member 50 of suitable heat-insulating properties overlying the outer face of the sill member 45ᵃ and the foundation therebelow. The inner end of each bolt 49ᵃ has a nut threaded thereon and a heat-insulated washer interposed between said nut and the upright angle iron 48, thereby giving the same protection against heat conduction previously described in connection with the metallic parts of the battens 28 and studs 20.

Fig. 4 also illustrates a preferred form of trim that may be used at the base of the panels 30 on all the interior surfaces. This trim consists of a strip of sheet metal 52 bent in hollow form with an upright exposed face and with inwardly turned flanges along its inner face adapted to be applied by pressure over the ends of spring clips 53 mounted on the inner end of the bolts 49ª as shown.

Fig. 17 shows a preferred arrangement for the door sill 60 which forms part of the door panel 30ᵇ. The body portion of the sill rests on the top of the angle iron 48, and the outer flanged portion 60ª of said sill engages the outer face of the retaining strip 49, which may be notched or cut away along its outer edge to receive said sill, if necessary.

Referring now to the details of the roof structure which is particularly designed for use in the module system hereinbefore described, the roof is made up of a plurality of panel sections that are prefabricated to a shape corresponding to the modular lines employed in the building plan. Such panel sections may, therefore, be either square to cover one modular unit, or rectangular to cover two or more of such units. Where the panel sections are to project beyond the building to form overhanging eaves, as shown in Fig. 25, the outer edges of such panels are preferably extended beyond the normal modular lines along the outer walls to form such eaves as indicated at 70ª.

In the form of roof construction shown in detail in Figs. 25 to 28, said panel sections are made up of a plurality of base panels 70 preferably made of some insulating material of the required strength and thickness. For instance, in the form shown in Fig. 26, each panel is made up of marginal frame members 71 which may be of wood, and upper and lower layers of sheet material 72 and 73 of laminated wood or other suitable material, and having insulation therebetween, as for instance spaced fiber sheets 73ª, 73ª each provided with heat-reflecting media on one or more surfaces thereof. The base panels 70 are supported with their edges resting along spandrels 24 or cross beams 22. Since said spandrels and cross beams are disposed along the predetermined module lines of the structure, the panels will be readily fitted thereon. A preferred means of securing adjacent edges of the panels to said cross beams and spandrels is illustrated in detail in Fig. 26 in which it will be seen that screws 75, 75 are passed downwardly through countersunk recesses 75ª, 75ª formed along the edges of the base panels 70, which screws are threaded in registering holes formed in the top flanges of the cross beams 22 or spandrels 24.

Ridge members 77, 77 are secured along the meeting edges of adjacent base panels and close the joint therebetween. Said ridge members are preferably formed of wood strips tapered upwardly along their sides, and secured to the base panels by nails 76, 76, as shown in Fig. 27.

Each of the base panels 70 may be overlaid by a sheet metal cover 80 having upwardly flanged margins 80ª which fit against the sides of the ridge strips 77. Metal ridge caps 81 are then fitted along the upper edges of said ridge strips with their side flanges 81ª, 81ª overlapping the flanges 80ª of the metal cover sheet 80. The ridge caps are preferably secured to the ridge strips by a plurality of lead-headed nails 82, 82 of a well known form, which effectively seal the nail holes.

At the junction of intersecting ridge members, I provide a metal joint cap 83 (see Fig. 29) formed in the shape of a cross with depending flanges 83ª which fit over the ends of the adjacent metal ridge caps 81 to provide a closed joint at each junction thereof, as clearly shown in Fig. 28.

Where the roof panels have eave extensions 70ª along the sides of the building, said panels may be finished by extending the ridge members 77 and ridge caps 81 downwardly at a right angle over the outer edges of the roof, as clearly indicated in Figs. 25 and 27. The metal roof covers 80 are also extended downwardly by flanges 80ᵇ and are thence turned upwardly over angle irons 84 which are secured along the lower corners of the panel extensions 70ª, as clearly shown in Fig. 25. Where a gutter 85 is to be employed, the same may be suspended from the angle iron 84, as indicated in Fig. 25.

Fig. 26 also illustrates an arrangement for closing the space between the bottom flanges of cross beams 22, 22 where the same are to be finished on the interior without having partitions fitted therein. In such cases a filler strip 85 may be secured over the opposed lower flanges by means of screws 86 screwed into retaining bars 87 disposed at suitable intervals along the interior of the beams. Said retaining bars are preferably of substantial length to engage the opposed upright faces of the beams so that rotation of said strips will be restrained when the screws are being applied thereto.

Figures 30, 31, 32:
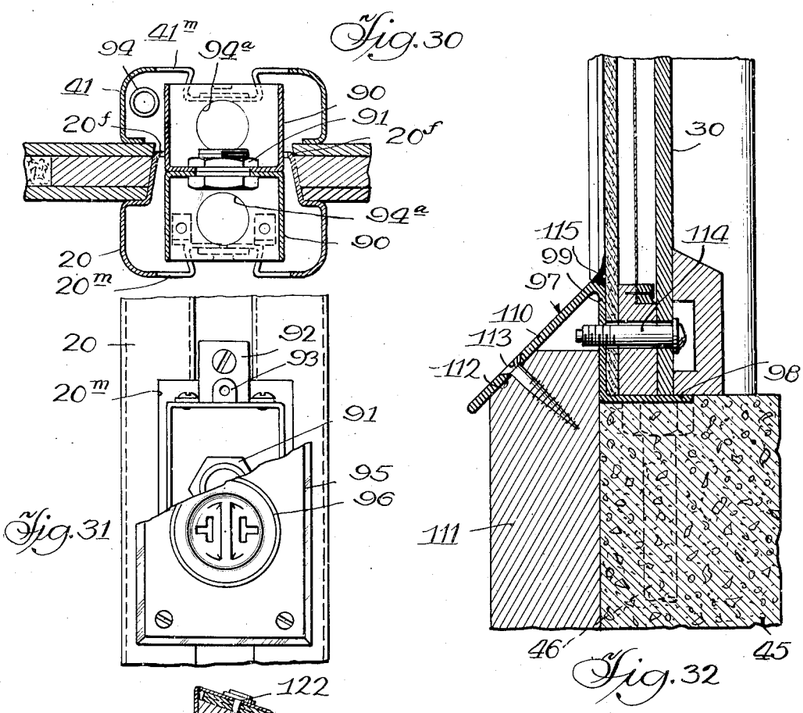
Fig. 30 is an enlarged detail view in horizontal section through an interior stud member showing a double outlet box forming a part of the wiring system mounted therein.
Fig. 31 is a side view of the construction shown in Fig. 30 with a part of the outlet fixture cover plate to show the outlet box.
Fig. 32 is an enlarged detail section somewhat similar to Fig. 4, but showing a modified form of foundation sill structure and method of mounting the lower edge of a wall panel thereon.

A further advantage of my improved building construction is its especial adaptation for the installation of electric wiring and outlet switch, and lighting fixtures in and through the framework made up of the hollow studs, cross beams and spandrels. Figs. 30 and 31 illustrate certain constructions wherein approved outlet fixtures or switches may be mounted in the upright studs.

In Figs. 30 and 31 an interior stud 20 with supplemental stud member 41 has two outlet boxes 90, 90 mounted therein to serve opposite sides of the stud. Said boxes are of the usual rectangular metallic form and are secured in back-to-back relation by a hollow nipple 91 which provides communication for electrical connections (not shown) between the two boxes. The outer walls of the stud are cut away as indicated at 20ᵐ and 41ᵐ opposite the open faces of the outlet boxes. The terminal flanges 20ᶠ, 20ᶠ on the interior of the stud member 20 are also cut away to receive said boxes.

Said boxes are suitably secured in place as by brackets 92 screwed in the bottom of the panel-receiving grooves on opposite faces of the stud and secured to lugs 93 projecting from the top and bottom of the outlet boxes, as clearly shown in the drawings.

Wire conduits 94, 94 of standard form may be laid through the hollow body of the stud, there being room for said conduits to pass around the opposite sides of the outlet box 90 if necessary, as indicated in Fig. 30. Said conduits may be led into the outlet boxes through apertures 94ª, 94ª usually provided for this purpose at the top or bottom of said boxes.

The outlet fixture may be suitably completed by a cover plate 95 secured to the outer face of the stud to cover the apertures 20ᵐ and 41ᵐ as shown in Fig. 31. In the form shown, the cover plate includes an outlet socket 96. Switch outlets or fixture outlets may also be used with this arrangement.

Provision is also made for passing electric conduits through the framework of the building at the main junction points. Thus as seen in Figs. 3, 5 and 25, the upright studs 20 are provided with apertures 100 registering with apertures 101 in the upright webs of the cross beams 22 and cut out registering portions 102 formed in the end plate 24ª of the spandrels 24. Similar apertures are provided at other junction points of the framework. With this arrangement the conduits may be inserted in and strung along any of the cross beams, spandrels or studs so as to provide outlets or switches at any desired point of the building frame. The wiring may be done after the framework has been erected and the building partially completed. Changes and additions to the wiring system may also be readily made, after the building is completed, since the interior of the hollow framework is easily accessible throughout the building.

Fig. 32 illustrates a modification of the form and arrangement for mounting and securing the lower edge of the wall panel 30 on the foundation sill 45, as compared with the construction illustrated in Fig. 4. In the modified form illustrated, a metal strip 97 formed of sheet steel or the like, having a horizontal flange or foot 98 which extends along the outer margin of the foundation, an intermediate vertical portion 99 substantially flush with the outer face of said foundation, and an outwardly and downwardly inclined portion 110 forming a skirt extending from the upper end of the upright portion 99. The foot 98 is preferably embedded in or otherwise secured to the foundation, as by the bolt 46 interposed at intervals to secure the upright studs arranged as in Fig. 3. A strip of suitable insulating material such as wood indicated at 111 with its upper outer corner chamfered as indicated at 112, is inserted so as to fit beneath the skirt portion 110, and with its inner face lying flatwise against the outer surfaces of the foundation 45 and the upright portion 99, as clearly shown in Fig. 32. A plurality of screws 113 may be inserted at suitable distances along the skirt 110 to secure it to the insulating member 111 as shown.

With this sill construction, the upright panels such as indicated at 30, may be fitted with their lower edges in the angle formed between the foot and vertical portions 98 and 99 of the sill strip, and secured by means of a screw 114 passing from the inner face of the upright wall into threaded engagement with the upright portion 99, as shown. The joint between the outer surface of the wall panel and the upper end of the skirt 110 may be sealed by suitable waterproofing material such as mastic, as indicated at 115.

Figure 33:
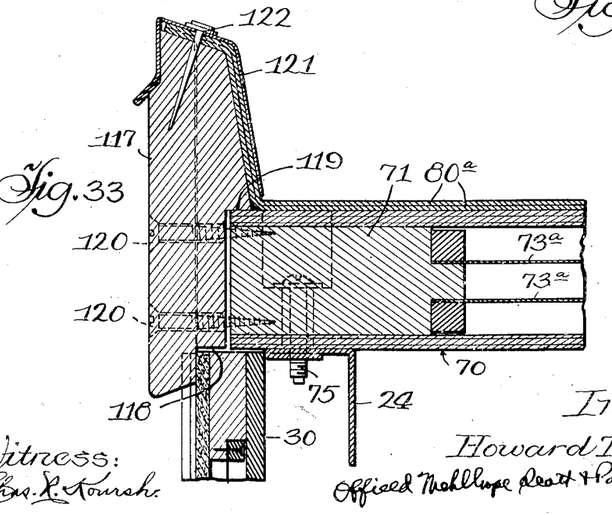
Fig. 33 is an enlarged detail section showing a modified form of construction at the junction of the side wall and roof, to form a coping, instead of an overhanging eave construction illustrated in Fig. 25.

In the modified form of roof structure shown in Fig. 33, it will be noted that the roof panel 70 is generally similar in construction to the form of roof panel shown in Figs. 25 and 26, excepting that the outer edge of said panel terminates at the module line which passes, as usual, through the median plane of the outer wall panel 30. A coping strip 117 is applied along the outer margin of the panel 70, said strip having its lower edge rabbeted as at 118 to fit over the upper edge of the wall panel 30, and having an overhanging shoulder at 119 adapted to fit over the top of the panel 70. Said coping strip is suitably held in place as by screws 120, 120 inserted from the outer face of said strip and extending into the frame 71 of the roof panel. The upper surface of the roof is completed, as by sheets of roofing felt 80ª, 80ª or like roofing material, which sheets extend upwardly along the inner and upper faces of the coping strip 117, and are flashed by a metal cap piece 121 preferably secured to the coping strip by a plurality of lead headed nails 122 of a well known form which effectively seal the nail holes. With this construction, the roof panels 70 all conform to the module system so as to be fully interchangeable with each other.

Although I have illustrated and described certain embodiments of my invention, it will be understood that I do not wish to be limited to the exact construction shown and described, but that various changes and modifications may be made without departing from the spirit and scope of my invention as defined in the appended claims.

I claim:

1. In a building structure, the combination of a framework including upright studs of sheet metal having grooves formed along opposite sides thereof and having a third groove on a third side of said stud, all of said grooves being symmetrically disposed at right angles to each other and at equal distances from the longitudinal axis of its respective stud, a plurality of cross beams connected to said studs, each consisting of two channel members with their opposed flanges extending toward each other, upright building panels having their adjacent lateral edges fitting in the oppositely disposed grooves in said studs, and another panel having its upper edge fitting between the lower flanges of said channel members, and its lateral edges fitting into said third groove.

2. In a building structure, the combination of a framework including upright studs of sheet metal, each having grooves formed along opposite sides thereof and having a third groove on a third side of said stud, each of said grooves being symmetrically disposed at right angles to the other grooves and at an equal distance from the longitudinal axis of its respective stud, a plurality of cross beams connected to said studs, each including two opposed flanges extending toward each other forming channel members, upright building panels having their adjacent lateral edges fitting in the oppositely disposed grooves in said studs, and another panel having its upper edge fitting between the lower flanges of said channel members, and its lateral edges fitting into said third groove.

3. In a building structure, the combination of a framework including an upright hollow stud formed of sheet metal generally rectangular in cross section, and two horizontal beams each consisting of a channel member with an upright web and horizontally disposed flanges, one of said beams having its horizontal flanges cut away adjacent its end to permit its extending upright web portion to be disposed directly against and along one side of said stud, and a second channel member disposed at right angles to said first named channel member and having its flanges cut away adjacent its end and with its upright web portion turned inwardly at right angles so as to overlap the web of said first named channel member in registering position with said stud, and means for securing said stud and upright web members together, including a bolt extending through registering holes in all of said members.

4. In a building structure, the combination of a framework including a plurality of upright load-bearing studs adapted to be optionally disposed in varying arrangements at the intersections of predetermined module lines forming squares in a horizontal plane, each of said studs comprising an upright hollow member formed of sheet metal generally rectangular in cross section, and horizontal beam members of two different types adapted to co-operate with each other and with said upright studs to complete the framework along said predetermined module lines, the beams of one of said types each consisting of a channel member having an upright web and horizontally disposed flanges, said horizontal flanges being cut away adjacent the end of said beam to permit the extended upright web portion thereof to be disposed directly against and along one side of an adjacent supporting stud, and the beams of the second named type each consisting of a channel member of similar cross section, but having its upright web portion turned inwardly at a right angle, the arrangement being such that the second type of beam may be disposed at a right angle to the first type of beam with its inturned end web portion overlapping the extended end web portion of the latter, and predetermined registering holes formed in the side walls of said studs and the end web portions of the two types of beams whereby said beams and studs may be interchangeably assembled and secured together by bolts passed therethrough.

HOWARD T. FISHER.